Sept. 16, 1952      L. J. HIBBARD      2,611,117
CONTROL SYSTEM FOR ELECTRICALLY-OPERATED VEHICLES
Filed April 19, 1949      2 SHEETS—SHEET 1

INVENTOR
Lloyd J. Hibbard.
BY
ATTORNEY

WITNESSES:

Sept. 16, 1952  L. J. HIBBARD  2,611,117
CONTROL SYSTEM FOR ELECTRICALLY-OPERATED VEHICLES
Filed April 19, 1949  2 SHEETS—SHEET 2
Fig. 3.
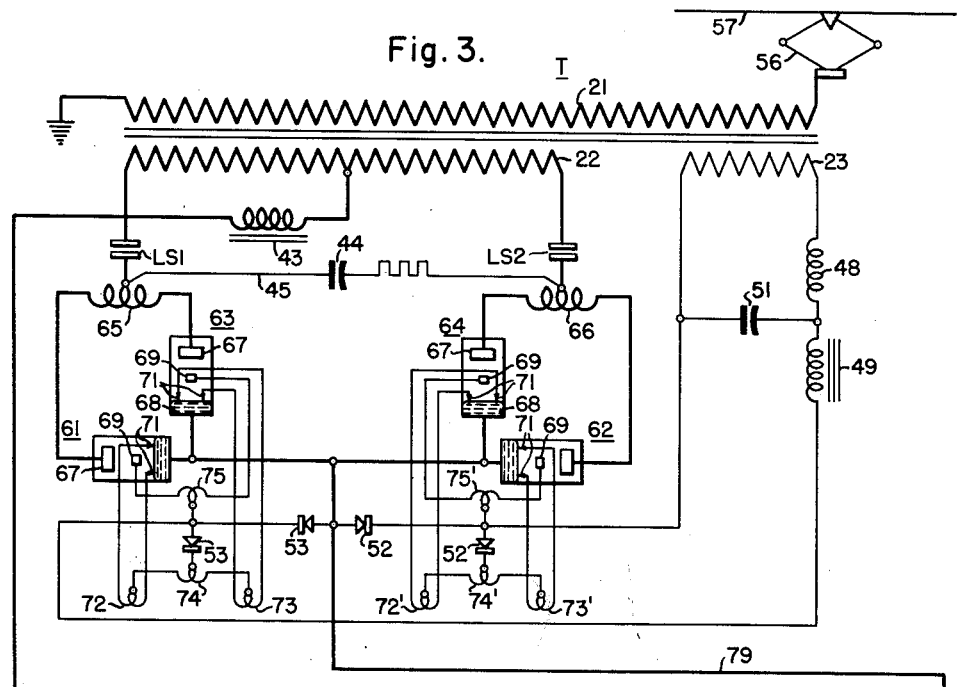
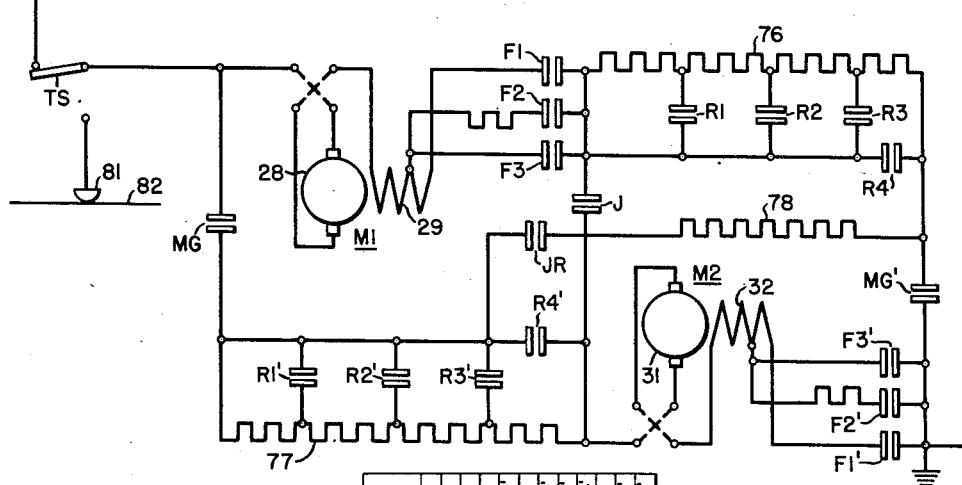
Fig. 4.
WITNESSES:
Robert C. Baird
[signature]
INVENTOR
Lloyd J. Hibbard.
BY G. M. Crawford
ATTORNEY Patented Sept. 16, 1952

2,611,117

UNITED STATES PATENT OFFICE 2,611,117

CONTROL SYSTEM FOR ELECTRICALLY-OPERATED VEHICLES

Lloyd J. Hibbard, Pittsburgh, Pa., assignor to Westinghouse Electric Corporation, East Pittsburgh, Pa., a corporation of Pennsylvania Application April 19, 1949, Serial No. 88,285

15 Claims. (Cl. 318—414)

My invention relates, generally, to control systems and, more particularly, to systems for controlling the operation of electrically-operated vehicles, such as multiple-unit railway cars, which are equipped with rectifiers for converting alternating current to direct current for the traction motors.

The development of rectifiers, particularly those of the ignitor type, for application in the industrial and power fields has created interest in utilizing them in vehicle propulsion work where they have certain advantages. The rectifier affords an opportunity to combine the best features of the alternating-current and the direct-current systems. The advantage of transmitting power at a high alternating-current voltage is retained, while the reliability and excellent tractive effort characteristics of the direct-current traction motor are secured.

However, the application of a rectifier to moving vehicles and single phase circuits involves certain problems not encountered in stationary service. One of these problems is the elimination of objectionable interference with communication circuits when operating from a single phase trolley with rail return. Another is the assurance of firing stability and mechanical adequacy of the rectifier tubes when mounted on moving vehicles.

Present rectifiers of the ignitor type which are used for commercial purposes utilize mercury in the cathode pool. When such a rectifier is mounted on a moving vehicle, the surface of the mercury pool is agitated by various movements of the vehicle. If some particular movement of the vehicle matches the natural period of oscillation of the pool, the mercury may splash around violently.

The function of the ignition electrode or ignitor is to produce a cathode spot which initiates a discharge between the anode and the cathode. The ignitor produces a cathode spot when the voltage gradient along the ignitor rod exceeds some given value at the point where the ignitor rod enters the mercury. The amount of current required to set up the correct voltage gradient for firing is varied if there is variation in the depth of immersion of the ignitor in the mercury pool. With deep immersion a high current is required, with shallow immersion, a low current. The mercury may splash high enough to short-circuit the ignitor.

The most continuously severe agitation of the mercury surface in a rectifier on a vehicle, such as a locomotive or M. U. car, is induced by the rolling or nosing action of the vehicle, which may cause the mercury to surge back and forth in its container or tube in synchronism with the nosing or rolling of the vehicle. This will cause the mercury to be alternately high and low at one side of the tube. When it is high on one side, it will be low on the opposite side and vice versa. If an ignitor is mounted at the center of the mercury pool, its change in depth of immersion will be a minimum for the type of agitation and mercury movement most likely to occur on a locomotive or M. U. car.

However, in order to insure that a rectifier will continue to fire under severe conditions of agitation, it is usually desirable to provide it with more than one ignitor. Furthermore, it is desirable to provide a locomotive or M. U car with more than one rectifier to insure continuity of service.

An object of my invention is to control the operation of a plurality of rectifiers which are mounted upon a vehicle, such as an M. U. car.

Another object of my invention is to so mount and connect a plurality of rectifiers on a railway vehicle that continuity of service is obtained.

A further object of my invention is to energize a plurality of ignitors for rectifiers.

Still another object of my invention is to gradually increase the voltage applied to traction motors supplied with rectified current, without the use of heavy, bulky and costly preventive-coils.

A still further object of my invention is to provide for operating the traction motors of a railway vehicle from either rectified or direct current.

Other objects of my invention will be explained fully hereinafter or will be apparent to those skilled in the art.

In accordance with an embodiment of my invention, a plurality of rectifiers of the ignitor type are utilized to supply rectified current to the traction motors of a railway vehicle. The ignitors for all of the rectifiers are energized from one source and provision is made for increasing the voltage on the motors step-by-step. Filter circuits are provided for preventing interference with communication circuits.

For a better understanding of the nature and objects of my invention, reference may be had to the following detailed description, taken in conjunction with the accompanying drawings, in which:

Figure 3 is a diagrammatic view of a modification of the invention, and

Figure 4 is a sequence chart for the system shown in Fig. 3.

Figures 1, 2:
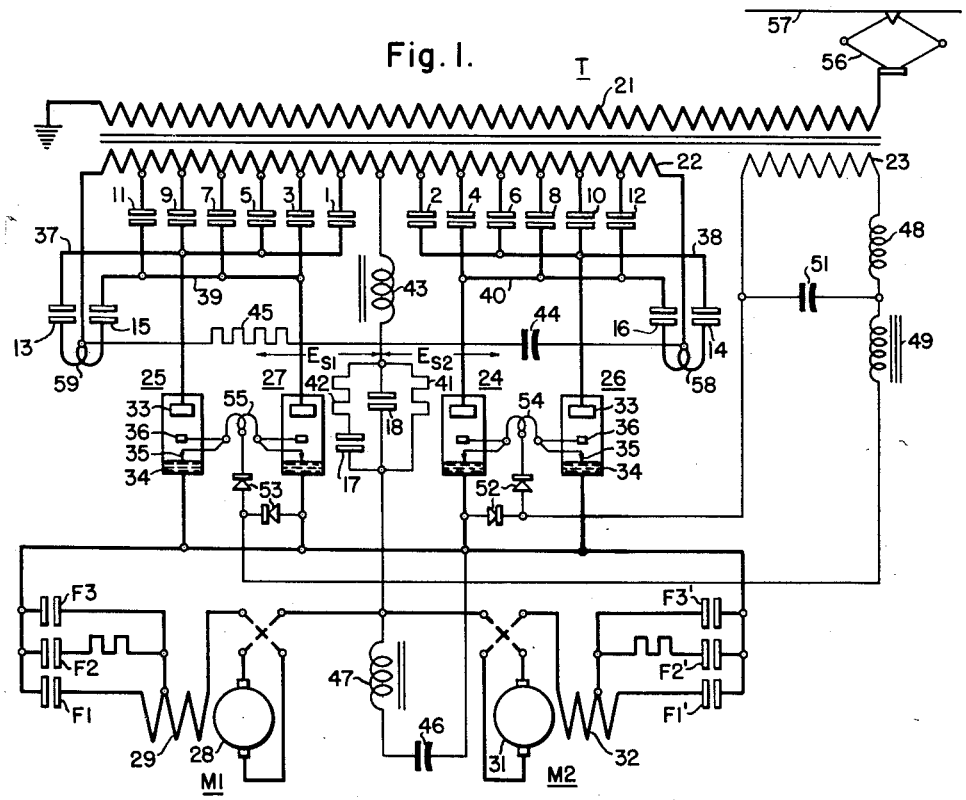
Figure 1 is a diagrammatic view of a control system embodying the principal features of my invention.
Figure 2 is a chart showing the sequence of operation of the switches illustrated in Fig. 1.

Referring to the drawings, and particularly to Fig. 1, the system shown therein comprises traction motors M1 and M2, a transformer T having a primary winding 21 and main and auxiliary secondary windings 22 and 23, and rectifiers 24, 25, 26 and 27 for supplying rectified current to the motors M1 and M2. As shown, the motors are of the series direct-current type, the motor M1 having an armature winding 28 and a series field winding 29. The motor M2 has an armature winding 31 and a series field winding 32.

The rectifiers are preferably of the ignitor type. Each rectifier has an anode 33, a mercury cathode 34, an ignition electrode or ignitor 35 and an auxiliary anode 36.

As shown, the anodes 33 of the rectifiers may be connected to the main secondary winding 22 of the transformer T by means of a plurality of tap-changing switches 1 to 16, inclusive. The tap-changing switches are divided into two groups, the odd-numbered switches being in one group and the even-numbered switches being in the other group. Two buses 37 and 39 are provided for the odd-numbered switches and two additional buses 38 and 40 are provided for the even-numbered switches. Alternate switches of each group are connected to the same bus.

The rectifier 25 is connected to the bus 37 and the rectifier 27 is connected to the bus 39. Likewise, the rectifier 24 is connected to the bus 40 and the rectifier 26 is connected to the bus 38. Thus, the voltage applied to the rectifiers, and hence to the motors M1 and M2, may be increased by closing the tap-changing switches in sequential relation, as will be explained more fully hereinafter.

In accordance with the usual practice, field shunting switches F1, F2 and F3 are provided for shunting a portion of the field winding 29 of the motor M1. Similar switches F1', F2' and F3' are provided for shunting a portion of the field winding 32 of the motor M2. In this manner, the speed of the motors may be increased by reducing the field strength of the motors in a manner well known in the art. The speed of the motors may also be increased by shunting two notching or accelerating resistors 41 and 42 from the motor circuit by means of switches 17 and 18.

A reactor 43 is provided in the circuit for the motors M1 and M2 to reduce the ripple in the rectified current provided by the rectifiers. Filter circuits are also provided for preventing interference with communication circuits. The filter circuits may be of the type fully described in my copending application Serial No. 120,331, filed October 8, 1949. As shown, a filter circuit comprising a capacitor 44 and a damping resistor 45 is connected across the end terminals of the main transformer winding 22. Another filter circuit comprising a capacitor 46 and a reactor 47 is connected across the motors M1 and M2. As explained in the aforesaid copending application, these filter circuits function to prevent interference with communication circuits which may be in the vicinity of the track over which the present railway vehicle operates.

The ignitors 35 and the auxiliary anodes 36 of the rectifiers may be energized by an impulse generator circuit which is connected to the auxiliary secondary winding 23 of the transformer T. As shown, the impulse generator circuit comprises a linear reactor 48, a saturable reactor 49 and a capacitor 51. The capacitor 51 is charged through the linear reactor 48 and the capacitor voltage is continuously applied to the saturable reactor 49 until the current reaches a value at which the reactor saturates. At this point, the capacitor 51 is discharged through the reactor 49 and a large peak current passes through the ignitors of the rectifiers, thereby causing the rectifiers to fire. By providing current blocking rectifying devices 52 for the rectifiers 24 and 26 and similar devices 53 for the rectifiers 25 and 27 the ignitors for both pairs of rectifiers may be energized from one impulse generator.

As shown, the ignitors and auxiliary anodes of the rectifiers 24 and 26 are connected to the end terminals of a balance coil 54 the midpoint of which is connected to the ignition circuit. The balance coil 54 functions to divide the ignition current equally between the ignitors of the rectifiers 24 and 26. A similar balance coil 55 is provided for the ignitors of the rectifiers 25 and 27.

Assuming that the primary winding 21 of the transformer T is energized from a suitable source of alternating current through a current collector 56 and a trolley conductor 57, direct current power may be initially applied to the motors M1 and M2 by closing the tap-changing switches 1 and 2 and the field switches F1 and F1' as indicated by the sequence chart in Figure 2. It will be understood that the operation of these switches may be controlled by means of a manually operable controller (not shown) or by other means well known in the railway control art.

When the tap switch 1 is closed, the anode 33 of the rectifier 25 is connected to a low-voltage tap on one side of the midpoint of the main transformer secondary winding 22. Likewise, the closing of the switch 2 connects the anode 33 of the rectifier 26 to a corresponding tap on the other side of the midpoint of the main secondary winding 22. Thus, during one-half cycle of operation, current flows from the main transformer winding 22 through the tap switch 1, the bus 37, the rectifier 25, the motors M1 and M2, the notching resistor 41 and the ripple-reducing reactor 43 to the midtap on the main transformer winding 22. During the other half cycle of operation, the current flows from the main transformer winding 22 through the top switch 2, the bus 38, the rectifier 26, the motors M1 and M2, the notching resistor 41 and the ripple-reducing reactor 43 to the midtap on the main transformer winding.

As indicated by the sequence chart, the voltage applied to the motors may be increased by closing the next-higher-voltage left-side tap-switch 3, and immediately thereafter opening the low-voltage left-side tap-switch 1. Current now flows during one-half cycle from the main transformer winding 22 through the second left-side tap switch 3, the bus 39, the second left-side rectifier 27, the motors M1 and M2, the notching resistor 41 and the ripple-reducing reactor 43 to the midtap on the main transformer winding. As soon as the second left-side tap-switch 3 is closed, and even before the low-voltage left-side tap-switch 1 is opened, current flows through the second left-side rectifier 27, because the second left-side tap-point 3 has a higher voltage than the first left-side tap-point 1. This applies the higher voltage of the tap-point 3, (minus a small rectifier-drop), to the common cathode-circuit of the rectifiers, thus making the cathode 34 of the previously conducting left-side rectifier 25 more positive than the anode 33 of said rectifier 25, instantly interrupting the current-flow through said previously conducting rectifier 25, and consequently instantly interrupting the current-flow through the low-voltage left-side tap-switch 1, even before said tap-switch 1 is opened. Thus, there is no arcing as a result of the opening of the low-voltage tap-switch 1. During the other half cycle, current continues to flow through the right-side rectifier 26.

The voltage applied to the motors may be further increased by closing the right-side tap-switch 4, having the same second-voltage value as the left-side tap-switch 3, and immediately thereafter opening the right-side tap-switch 2, thereby causing current to flow through the rectifier 24 instead of the rectifier 26. In this manner, the rectifiers of each pair are alternately energized and deenergized during the tap-changing operation by the alternate closing of the tap-changing switches.

As indicated by the sequence chart, the switch 17 may be closed at a desired time to connect the second notching resistor 42 in parallel-circuit relation with the first notching resistor 41, thereby further increasing the motor current. The operation of the tap-changing switches may be continued to increase the voltage applied to the motors.

As shown, one end terminal of the main transformer secondary winding 22 is connected to the buses 37 and 39 through the tap switches 13 and 15 and a balance coil 59. The other end terminal of the main transformer secondary winding 22 is connected to the buses 38 and 40 through the switches 14 and 16 and a balance coil 58. Thus, when the switches 13, 14, 15, and 16 are closed, full voltage is applied to the motors and all of the rectifiers are utilized to supply rectified current to the motors during the running operation.

As previously explained, the field shunting switches F2, F3, F2' and F3' may be closed to shunt a portion of the motor field windings from the motor circuit, thereby decreasing the field strength and increasing the maximum speed of the motors. Thus, the motors are brought up to their maximum running speed.

It will be noted that the tap-changing operation is performed without requiring preventive coils across the buses for the tap-changing switches, such as are usually required in previous tap-changing systems which did not use the automatic current-commutating effect of two like-polarity rectifiers which are connected to successive voltage-taps of the transformer. These previously required preventive-coils were much heavier, bulkier, and costlier than the relatively light balance-coil (or other load-dividing means) 58 and 59 which I use, because my balance-coils are not connected across diverse-voltage taps of the main transformer secondary winding 22, and a much smaller coil-voltage is required to effect reasonable load-distribution between the parallel-connected rectifiers than the voltage-steps between successive transformer-taps. My two like-polarity left-side rectifiers 25 and 27, which are connected between successive left-side voltage-taps of the left half of the main transformer secondary winding 22, perform the old preventive-coil function of preventing the short-circuiting of a portion of the transformer, because, with respect to currents which would tend to flow from one tap to the next, these two left-side rectifiers 25 and 27 are connected in back-to-back relation, or in reversed polarities, so that transformer-shorting currents will be blocked by one or the other of the two rectifiers, depending upon the direction of attempted current-flow. A similar action is obtained, of course, by the two right-side rectifiers 24 and 26, and throughout the voltage-increasing manipulation of the tap-switches. In this manner, the cost and the additional weight of the preventive coils are eliminated. Also, tap-changing is accomplished without voltage sag or surges, because each successive higher-voltage step is taken before the preceding voltage-tap is opened, and without arcing of switches, because of the above-described instantaneous commutating-effect of two parallel-connected like-polarity rectifiers operating momentarily simultaneously on two successive voltage-taps of the transformer.

In the modification of the invention shown in Figure 3, in which like parts are designated by the same reference characters as in Figure 1, two rectifiers 61 and 63 are connected to one end terminal of the main transformer secondary winding 22 through a balance coil 65 and a switch LS1. Likewise, two rectifiers 62 and 64 are connected to the other end terminal of the main transformer secondary winding 22 through a balance coil 66 and a switch LS2. In the Fig. 3 system, each rectifier has an anode 67, a cathode 68, an auxiliary anode 69 and two ignitors 71.

As explained hereinbefore, the most continuously severe mechanical agitation of the mercury surface of a rectifier mounted on a locomotive or M. U. car is induced by the rolling or nosing action of the vehicle which may cause the mercury to surge back and forth in its container in synchronism with the nosing or rolling of the car or locomotive. This will cause the mercury to be alternately high and low at one side of the tube. When it is high on one side, it will be low on the opposite side and vice versa.

If two ignitors are placed on opposite sides of the mercury pool 180 degrees apart and in line or vertical plane with the surging movement of the mercury, the ignitor on one side will be buried deeply in the mercury when the mercury surges to that side while the ignitor on the opposite side will have a shallow immersion. Then when the mercury recedes and surges to the opposite side of the pool, the first ignitor will have a shallow immersion while the second ignitor is deeply immersed.

If the two ignitors are connected directly in parallel, the deeply immersed ignitor will take most of the ignition current and if the ignitor is buried too deeply, it can not fire because sufficient current can not flow to build up the necessary voltage gradient. Also the other ignitor, which has only a shallow immersion, can not fire because of the increased resistance in the circuit produced by the extra length of the ignitor above the mercury and because of the heavy current load taken by the deeply immersed ignitor.

If the two ignitors are connected in parallel through a balance coil or other load-dividing means, the deeply immersed ignitor will again try to draw most of the current. However, if sufficient volt-ampere capacity is provided in the balance coil, it will build up the necessary counter volts to force the same value of current through both ignitors, thereby causing the shallow ignitor to fire.

As shown in Fig. 3, the two ignitors 71 of the left-side rectifier 61 are disposed on a line, or in a vertical plane, which extends transversely of the vehicle and at right angles to the line on which the two ignitors 71 of the other left-side rectifier 63 are disposed. The two ignitors 71 for the first-mentioned left-side rectifier 61 are connected to the end terminals of a balance coil 72. Also, the two ignitors 71 of the other left-side rectifier 63 are connected to the end terminals of a balance coil 73. The midpoints of these two balance coils 72 and 73 are connected to the impulse generator circuit through a balance coil 74. The auxiliary anodes 69 for the said left-side rectifiers 61 and 63 are also connected to the ignition circuit through a balance coil 75. In this manner, firing of at least one of the left-side rectifiers 61 or 63 at the proper time is practically assured, since the ignitors are disposed on lines which are at right angles to each other and are connected in parallel-circuit relation through balance coils. Since these two pairs of ignitors are disposed at right angles, one pair will be subjected to the least amount of splashing of the mercury during operation of the vehicle and, since they are connected in parallel through balance coils, one ignitor of each pair will be caused to fire in the manner hereinbefore explained.

The pairs of ignitors 71 of the right-side rectifiers 62 and 64 are similarly disposed in vertical planes which extend at right angles to each other, and these ignitors and the corresponding auxiliary anodes 69 are connected across the ignition circuit through balance coils 72', 73' and 74' in the same manner as has been described for the left-side rectifiers 61 and 63. Thus, the firing of at least one of the right-side rectifiers 62 or 64 at the proper time is assured.

In the system shown in Figs. 3 and 4, the voltage applied to the motors M1 and M2 is increased, in a known manner, by progressively shunting two accelerating resistors 76 and 77 from the motor circuit by means of resistor-shunting switches R1 to R4 and R1' to R4', respectively. As is also known, I show a last accelerating resistor 78 which is finally shunted out of the motor circuit during series operation, by the closing of a switch J during the accelerating cycle. Field shunting switches F1 to F3 and F1' to F3' are provided for decreasing the field strength of the motors in the manner hereinbefore explained.

Power may be applied to the motors by closing the switches LS1, LS2, JR, F1 and F1'. When the foregoing switches are closed, current flows during one-half cycle from the one terminal of the main transformer secondary winding 22 through the switch LS1, the balance coil 65, the rectifiers 61 and 63, conductor 79, the switch F1', the motor M2, the resistor 77, the switch JR, resistors 78 and 76, the switch F1, the motor M1, a transfer switch TS and the anti-ripple reactor 43 to the midtap of the main transformer secondary winding 22. During the other half cycle, current flows from the other terminal of the winding 22 through the switch LS2, the balance coil 66, the rectifiers 62 and 64, the conductor 79 through the motors M1 and M2 and back to the midtap of the transformer winding 43 as previously traced.

As explained hereinbefore, the voltage applied to the motors, during their series connections, may be increased by closing the resistance-shunting switches R1 to R4 and R1' to R4', and finally the switch J, in a known manner, as indicated by the sequence chart in Figure 4. The motor connections may be changed from series to parallel, in a manner well known in the art, by closing the switches J, MG and MG'.

The resistors 76 and 77 are then shunted from the parallel circuit connections by reclosing the switches R1 to R4 and R1' to R4' as indicated by the sequence chart. Maximum speed of the motors may be obtained by closing the field shunting switches F2, F2', F3 and F3'.

The Fig. 3 ignition apparatus comprising the reactors 48 and 49 and the capacitor 51 functions in the same manner as described in connection with Figure 1. Filter circuits similar to those shown in Figure 1 may be provided if desired.

The motors M1 and M2 may be disconnected from the rectifiers and operated from a direct-current source when direct-current power is available. As shown in the drawings, the transfer switch TS may be actuated to disconnect the motors from the transformer T and the rectifiers and connect them to a third rail shoe 81 which engages a conductor 82, which is energized from a direct-current source.

The accelerating resistors 76, 77 and 78 and the resistor-shunting switches may be utilized to accelerate the motors in the manner hereinbefore described. It will be understood that the operation of the resistor-shunting switches may be controlled in any suitable manner such as by means of a manually operable controller (not shown).

From the foregoing description, it is apparent that I have provided for operating the propelling motors of a railway vehicle on direct current which may be supplied by rectifiers provided on the vehicle or from an external source of direct current when available. The proper functioning of the rectifiers during operation of the vehicle is assured by the control and ignition systems herein described. Furthermore, the amount of equipment required is reduced to a minimum by the simplification of the control systems.

Since numerous changes may be made in the above described construction and different embodiments of the invention may be made without departing from the spirit and scope thereof, it is intended that all matter contained in the foregoing description or shown in the accompanying drawings shall be interpreted as illustrative and not in a limiting sense.

I claim as my invention:

1. In a control system for a vehicle, in combination, a plurality of motors for propelling the vehicle, a transformer having a primary winding and a secondary winding, said secondary winding having a midtap and end taps thereon, a plurality of rectifiers for supplying rectified current to the motors, a plurality of tap-changing switches for connecting the rectifiers to said secondary winding, said switches being divided into two groups with two buses for each group, alternate switches of each group being connected to the same bus, one of said rectifiers being connected to each one of said buses, a pair of switches for connecting each end tap to two of said buses, and a balance coil for each pair of switches.

2. In a control system for a vehicle, in combination, a plurality of motors for propelling the vehicle, a transformer having a primary winding and a secondary winding, said secondary winding having a midtap and end taps thereon, a plurality of rectifiers for supplying rectified current to the motors, a plurality of tap-changing switches for connecting the rectifiers to said secondary winding, said switches being divided into two groups with two buses for each group, alternate switches of each group being connected to the same bus, one of said rectifiers being connected to each one of said buses, one switch from one group being closed simultaneously with one switch from the other group during the tap-changing operation, a pair of switches for connecting each end tap to two of said buses, and a balance coil for each pair of switches.

3. In a control system for a vehicle, in combination, a plurality of motors for propelling the vehicle, a transformer having a primary winding and a secondary winding, said secondary winding having a midtap and end taps thereon, two groups of tap-changing switches connected to said secondary winding with two buses for each group, alternate switches of each group being connected to the same bus, a rectifier connected to each one of said buses for supplying rectified current to said motors, a conductor connecting all of said rectifiers to said motors, a pair of switches for connecting each end tap to two of said buses, and a balance coil for each pair of switches.

4. In a control system for a vehicle, in combination, a plurality of motors for propelling the vehicle, a transformer having a primary winding and a secondary winding, said secondary winding having a midtap and end taps thereon, two groups of tap-changing switches connected to said secondary winding with two buses for each group, alternate switches of each group being connected to the same bus, a rectifier connected to each one of said buses for supplying rectified current to said motors, and a conductor connecting all of said rectifiers to said motors, one switch from one group being closed simultaneously with one switch from the other group to energize said rectifiers alternately during the tap-changing operation, a pair of switches for connecting each end tap to two of said buses, and a balance coil for each pair of switches.

5. In a control system for a vehicle, in combination, a plurality of motors for propelling the vehicle, a transformer having a primary winding and a secondary winding, said secondary winding having a midtap and end taps thereon, and a plurality of pairs of rectifiers connected to said end taps on the secondary winding for supplying rectified current to the motors which are connected to said midtap, at least one pair of rectifiers being connected to each end tap, said rectifiers each having a pair of ignition electrodes, the electrodes for one rectifier of each pair being disposed on a line substantially at right angles to a line through the electrodes for the other rectifier of that pair.

6. In a control system for a vehicle, in combination, a plurality of motors for propelling the vehicle, a transformer having a primary winding and a secondary winding, said secondary winding having a midtap and end taps thereon, and a plurality of pairs of rectifiers connected to said end taps on the secondary winding for supplying rectified current to the motors which are connected to said midtap, at least one pair of rectifiers being connected to each end tap, said rectifiers each having a pair of ignition electrodes, the electrodes for one rectifier of each pair being disposed on a line extending transversely of the vehicle and the electrodes for the other rectifier of each pair being disposed on a line extending longitudinally of the vehicle.

7. In a control system for a vehicle, in combination, a plurality of motors for propelling the vehicle, a transformer having a primary winding and a secondary winding, said secondary winding having a midtap and end taps thereon, a plurality of rectifiers connected to said secondary winding for supplying rectified current to the motors which are connected to said midtap, at least two rectifiers being connected to each end tap, said rectifiers each having at least two ignition electrodes, the electrodes of a part of said rectifiers connected to one end tap being disposed on lines substantially at right angles to lines extending through the electrodes of the other rectifiers connected to said end tap.

8. In a control system for a vehicle, in combination, a plurality of motors for propelling the vehicle, a transformer having a primary winding and a secondary winding, said secondary winding having a midtap and end taps thereon, a plurality of rectifiers connected to said secondary winding for supplying rectified current to the motors which are connected to said midtap, at least two rectifiers being connected to each end tap, said rectifiers each having at least two ignition electrodes, the electrodes of part of said rectifiers connected to one end tap being disposed on lines extending transversely of the vehicle and the electrodes of the other rectifiers connected to said end tap being disposed on lines extending longitudinally of the vehicle.

9. In a control system for a vehicle, in combination, a plurality of motors for propelling the vehicle, a transformer having a primary winding and a secondary winding, said secondary winding having a midtap and end taps thereon, a plurality of rectifiers connected to said secondary winding for supplying rectified current to the motors which are connected to said midtap, at least two rectifiers being connected to each end tap, said rectifiers each having at least two ignition electrodes, the electrodes of part of said rectifiers connected to one end tap being disposed on lines substantially at right angles to lines extending through the electrodes of the other rectifiers connected to said end tap, an impulse generator for energizing said ignition electrodes, and a balance coil for the electrodes of each rectifier, said balance coils being connected between said impulse generator and said electrodes.

10. In a control system for a vehicle, in combination, a plurality of motors for propelling the vehicle, a transformer having a primary winding and a secondary winding, said secondary winding having a midtap and end taps thereon, a plurality of rectifiers connected to said secondary winding for supplying rectified current to the motors which are connected to said midtap, at least two rectifiers being connected to each end tap, said rectifiers each having at least two ignition electrodes, the electrodes of part of said rectifiers connected to one end tap being disposed on lines extending transversely of the vehicle and the electrodes of the other rectifiers connected to said end tap being disposed on lines extending longitudinally of the vehicle, ignition circuit means for energizing said ignition electrodes, and a balance coil for the electrodes of each rectifier, said balance coils being connected in the ignition circuits for said electrodes.

11. A rectifier-installation capable of reliable operation while subject to various kinds of vibration, comprising: a plurality of alternating-current supply-terminals; at least two pool-type vapor-electric rectifiers energized from each of said supply-terminals, each rectifier having an anode, a cathode-pool, and a plurality of make-alive ignitors which dip into the cathode-pool for making said rectifier become conducting during each positive half-cycle of the alternating-current supply-voltage which is applied to its anode; load-dividing means, associated with each of said supply-terminals, for causing a reasonable distribution of load between the rectifiers which are energized from that supply-terminal; direct-current load-means connected to be energized from said rectifiers; and ignitor-exciting means for each rectifier, comprising load-dividing means for tending to cause a reasonably equal division of current between the ignitors of that rectifier.

12. A rectifier-installation capable of reliable operation while subject to various kinds of vibration, comprising: a plurality of alternating-current supply-terminals; at least two pool-type vapor-electric rectifiers energized from each of said supply-terminals, each rectifier having an anode, a cathode-pool, and a plurality of make-alive ignitors which dip into the cathode-pool for making said rectifier become conducting during each positive half-cycle of the alternating-current supply-voltage which is applied to its anode, the ignitors of the rectifiers which are energized from any supply-terminal being disposed in different vertical planes whereby they will be differently affected by cathode-pool sloshing in any vertical plane; load-dividing means, associated with each of said supply-terminals, for causing a reasonable distribution of load between the rectifiers which are energized from that supply-terminal; and direct-current load-means connected to be energized from said rectifiers.

13. A variable-voltage rectifier-system comprising a multi-tap alternating-current supply-transformer having two groups of voltage-varying taps disposed on opposite sides of its midpoint, tap-switches connected to the several voltage-varying taps, a pair of buses for each group of voltage-varying taps, alternate switches of each group being connected to the same bus, a separate end-terminal switch connected between each bus and its associated end-terminal of the transformer, a pair of like-potential rectifiers energized from the respective buses of each pair, and direct-current load-means connected to be energized from said rectifiers.

14. The invention as defined in claim 13, characterized by switch-controlling means for progressively controlling the tap-switches for all voltage-steps except the highest voltage-step, and for closing all four of the end-terminal switches for the highest-voltage step, thereby simultaneously energizing all four of the rectifiers during highest-voltage operation, said switch-controlling means including means for providing a sequence of closure of the several tap-switches such that, on each voltage-step, only one tap-switch is closed on each side of the transformer-midpoint, thereby energizing only one rectifier on each of said sides, said sequence of closure of the several tap-switches being such that, in changing from one voltage-step to the next, two successive tap-switches are momentarily simultaneously closed on at least one side of the transformer-midpoint, thereby using the pair of rectifiers on that side as short-preventing means for the transformer and as switch-arcing preventive-means, as the tap-switches are progressively controlled.

15. The invention as defined in claim 13, characterized by load-dividing means connected between each of the end-terminals of the transformer and the two associated end-terminal switches, for causing a reasonable distribution of load between the rectifiers which are energized from that end-terminal.

LLOYD J. HIBBARD.

REFERENCES CITED

The following references are of record in the file of this patent:

UNITED STATES PATENTS

| Number | Name | Date |
|---|---|---|
| 1,204,411 | Conrad et al. | Nov. 14, 1916 |
| 1,804,614 | Hill | May 12, 1931 |
| 2,160,070 | Hruska | May 30, 1939 |
| 2,264,714 | Riley | Dec. 2, 1941 |
| 2,326,550 | Mittag | Aug. 10, 1943 |
| 2,387,262 | Hibbard | Oct. 23, 1945 |
| 2,426,054 | Rose | Aug. 19, 1947 |
| 2,466,843 | Garbuny | Apr. 12, 1949 |